May 23, 1967 J. N. DEWS ETAL 3,321,086
WASP-WAIST HOURGLASS-SHAPED DIALYSIS FERMENTOR FLASK
Filed Oct. 29, 1965
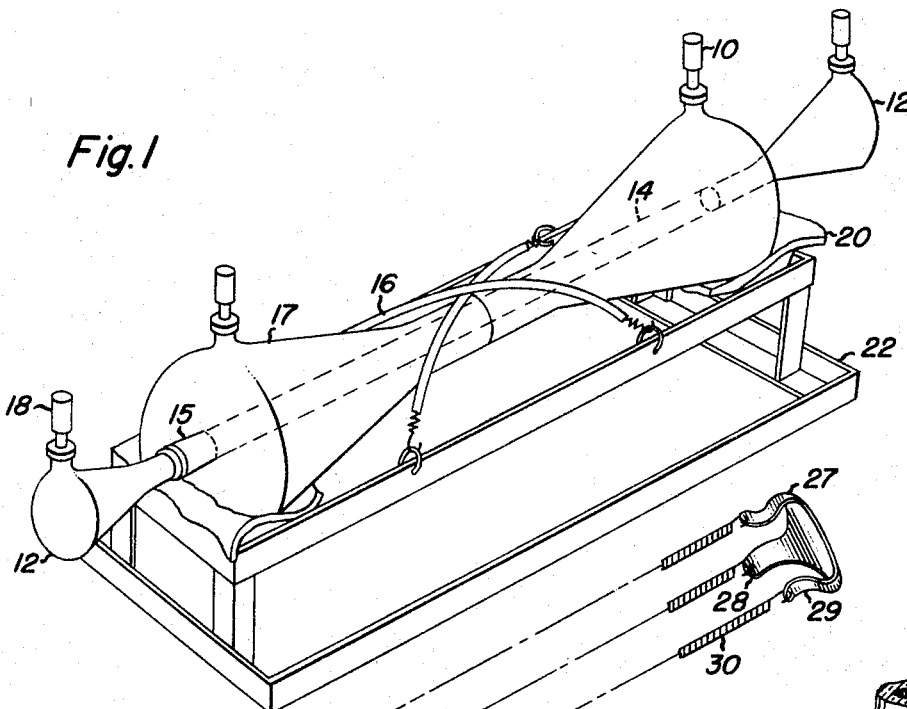
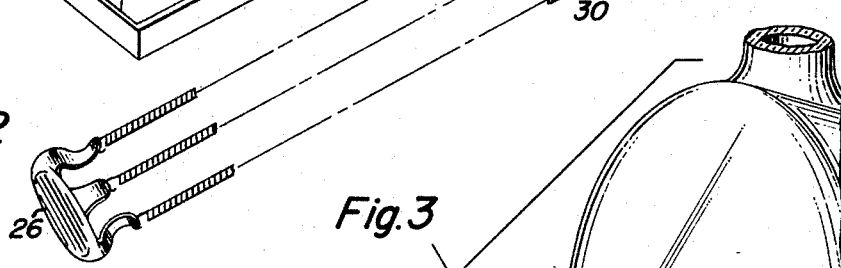
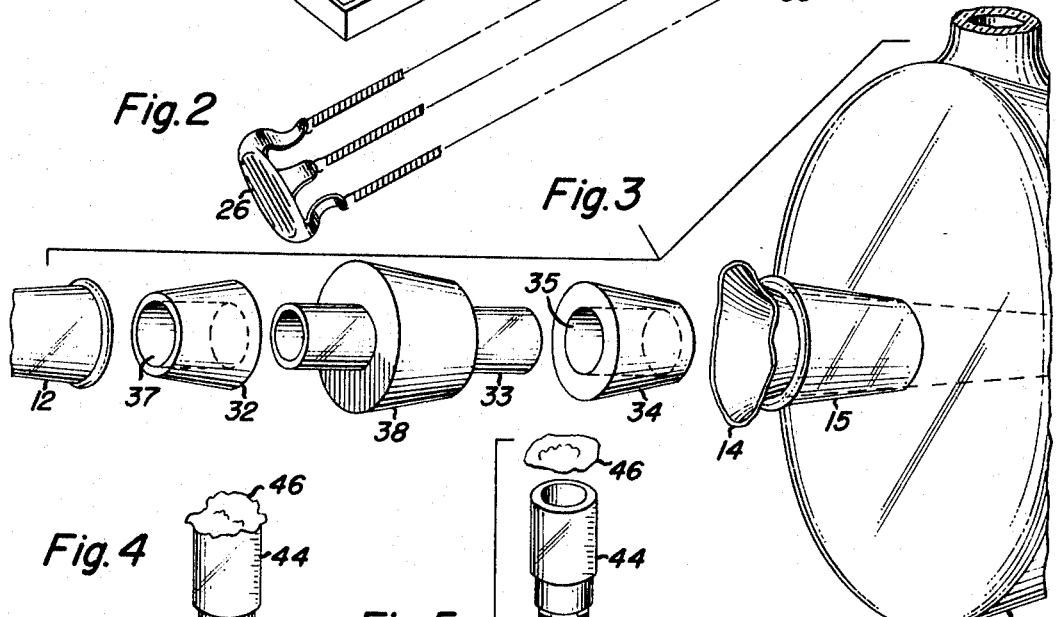
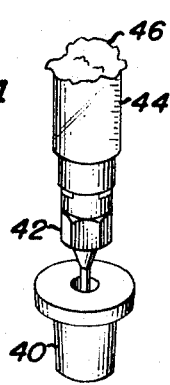
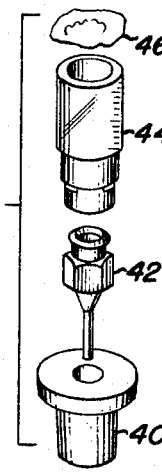
INVENTORS
Jule N. Dews
George W. Schmersahl
William C. Patrick, III
BY Harry M. Saragovitz
Edward J. Kelly, Herbert Berl
ATTORNEYS

3,321,086
WASP-WAIST HOURGLASS-SHAPED DIALYSIS
FERMENTOR FLASK
Jule N. Dews, Sylvan Heights, George W. Schmersahl, Frederick, and William C. Patrick III, Rockville, Md., assignors to the United States of America as represented by the Secretary of the Army
Filed Oct. 29, 1965, Ser. No. 505,763
5 Claims. (Cl. 210—321)

The invention described herein may be manufactured and used by or for the Government of the United States of America for governmental purposes without the payment to us of any royalty thereon.

The invention relates in general to a dialysis fermentor apparatus and more particularly to a dialysis fermentor apparatus wherein the basic configuration of the compartments thereof are drawn to the classical Venturi coordinates.

The invention introduces a new concept in dialysis fermentor vessel design wherein it applies specific established principles of fluid flow and inertia, normally associated with the science of Marine Architecture, to the design of a dialysis fermentor apparatus which utilizes a standard laboratory reciprocating shaker as a source of mechanical energy.

The velocity of a fluid over a membrane surface and the amount of surface area have been long identified as important influences in the rate of dialysis across a semipermeable membrane. When the instant dialysis fermentor apparatus is mounted upon a reciprocating shaker, inertia forces acting on fluids in both the reservoir and fermentation chambers cause the fluids therein to flow in an intermittently turbulent condition at relatively high velocity through the Venturi contoured constricted throats of both the outer and inner Venturi systems. The abundant membrane surface area furnished to both the reservoir and fermentation chambers by virtue of the novel concentric geometrical configuration of the instant apparatus, in conjunction with a rapid liquid flow is conducive to a rapid dialysis rate. The periodic and continuous reversal of liquid flow is also a distinct feature of this apparatus.

It is an object of the invention to provide for and disclose an apparatus for the separation of crystalloids from colloids in solution by the faster diffusion of the crystalloids through a semipermeable membrane.

Another object of the invention is to provide for and disclose an apparatus having an increased diffusion rate.

Another object of the invention is to provide for and disclose an apparatus for the diffusion of crystalloids through a semipermeable membrane wherein the diffused crystalloids are utilized as nutrients by bacteria or animal tissue cultures contained therein.

Another object of the invention is to provide for and disclose a dialysis culture apparatus capable of producing concentrated cultures of bacteria or other microorganisms.

Other objects and a fuller understanding of the invention may be had by referring to the following description taken in conjunction with the accompanying drawings in which:

FIGURE 1 shows an overall side view of the dialysis fermentor attached to a metal frame which mounts on a standard laboratory reciprocating shaker.

FIGURE 2 shows a top view of the flask compression yoke.

FIGURE 3 shows an exploded side view of the sub-components of the reservoir and the fermentation chambers.

FIGURE 4 shows a side view of the reservoir and fermentation chambers air vent assembly.

FIGURE 5 shows an exploded side view of the sub-components of the reservoir and the fermentation chambers air vent assembly.

Referring now to FIGURE 1, the dialysis fermentor apparatus comprises a wasp-waist hourglass-shaped reservoir 17, horizontally positioned upon a metal frame 22 which, in turn, fits a standard reciprocating shaker (not shown). The reservoir may be constructed of any suitable material, e.g., glass or rubber, and is suitably contoured in accordance with Venturi coordinates, so that when the liquid therein is pressurized, it accelerates in accordance with the Law of Mass Continuity, thereby constituting the outer Venturi system of the dialysis fermentor apparatus. In essence, the Law of Mass Continuity states that when a conduit, i.e., the reservoir in the instant case, is suitably contoured, i.e., in accordance with Venturi coordinates, and hydraulic pressure is applied to the liquid therein, the liquid velocity increases to a degree inversely proportional to the decrease in the constriction of the cross section of the reservoir. The hydraulic pressure is obtained by accelerating and decelerating the liquid and its container utilizing a standard laboratory reciprocating shaker in accordance with the principles of Newton's Second Law of Motion:

$$F = ma$$

Where:

$F$ = Force
$m$ = mass
$a$ = acceleration

Reservoir 17 contains orifices 10, located on the periphery thereof. The orifice serves as a means of ingress and egress, i.e., it has utility in venting, aeration and in addition serves as an inlet for the addition of materials to the reservoir. Reservoir 17 is secued at its narrow section to metal frame 22 of a standard incubator reciprocating shaker, not shown, by retaining straps 16 or by any other suitable means and cushioned by sponge rubber pad 20. The incubator reciprocating shaker is motivated by an external power not shown. Encompassed within the outer Venturi system of the dialysis fermentor apparatus is elongated semipermeable tubular memberane 14, extending throughout the entire length of the outer Venturi system at the center position thereof. The semipermeable membrane may be constructed of any suitable material, e.g., regenerated cellulose, cellulose acetate, resin-nylon, Teflon, glass, plastic, asbestos, unglazed porcelain, porous stainless steel and sintered glass. The ends of the semipermeable membrane are extended through short tubing 15 so as to constitute a lining therein. Tubing 15 is attached to and protrudes beyond each of the extreme flat ends of the reservoir 17. The semipermeable membrane is extended beyond the extreme ends of tubing 15 and the excess membrane folded over and back toward reservoir 17 so as to constitute a partial covering of the outside area of tubing 15. Rubber stopper 34 (FIGURE 3) containing channel 35 is positioned into semipermeable membrane lined tubing 15. Glass tubing 33, which extends through stopper 38, and protrudes a short distance beyond each end thereof, is fitted into channel 35 of stopper 34. The other end of glass tubing 33 is fitted into channel 37 of stopper 32. Stopper 32 is fitted into Erlenmeyer flask shaped compartment 12. Erlenmeyer flask shaped compartment 12 contains orifices 18 located on the periphery thereof. The orifices serve the identical function as the orifices located on the reservoir, i.e., venting, aeration and in addition, as an inlet for the addition of materials to the fermentation compartments. The operation may be limited to the anaerobic microbial growth processes by the insertion of vaccine bottle stopper 40 into orifices 10 and 18 so as to exclude the presence of air. The dialysis apparatus may be converted to an aerobic dialysis fermentor by the addition of filtered vents (FIGURE 4) to both the reservoir and the fermentation chambers consisting of a common vaccine bottle stopper 40, a No. 13 needle 42, a cutoff short 2 ml. syringe barrel 44 and cotton plug 46 inserted into the barrel of 44 to serve as filtering means as exemplified by FIGURE 5.

The support means utilized to secure the fermentation compartments of the inner Venturi system to the outer Venturi system of the dialysis fermentor apparatus comprises a pair of cylindrical shaped metal supports 26 (FIGURE 2) having evenly spaced projections 27, 28 and 29 extending in a radial direction therefrom. Support projections 27, 28 and 29 are connected to identical projections by wire springs 30. The compression yoke exerts a compressional force on fermentation compartments 12 securing the inner Venturi against the outer Venturi system thereby preventing loss of materials when an external force is applied to the dialysis fermentor apparatus.

The elongated semipermeable tubular membrane along with the fermentation compartment comprises the inner Venturi system. The semipermeable tubular membrane also serves as an interface between the two Venturi systems.

A comparison of the chemical diffusion rate of glucose was made utilizing the instant dialysis apparatus and a prior art dialysis apparatus as exemplified by the Gerhardt dialysis flask as described in the Journal of Bacteriology (1963), vol. 86, pp. 919–929. The results obtained disclosed a 10 mold superiority of the instant apparatus over the Gerhardt dialysis apparatus.

Example I 1000 mls. of a 0.15% glucose aqueous solution were placed in reservoir 17 of the Dews dialysis apparatus. 150 mls. of sterile distilled water were placed in fermentor compartment 12. The dialysis apparatus was placed on a standard laboratory reciprocating shaker operated at 99 strokes per minutes at an ambient temperature of 30° C. The fermentor compartment was periodically sampled and assayed for glucose concentration by the Anthrone method. The rate of diffusion was computed and expressed as the time required for the liquid in the fermentation chamber to reach one half of the final equilibrium concentration, i.e., $ET_{50}$. The results of six runs are set forth in Table I below. The mean $ET_{50}$ was 44 minutes.

TABLE I

| Run | Semipermeable Membrane | Tubing Stock Size, in. (flat) | Pore Size | Wall Thickness (inches) | $ET_{50}$ (minutes) |
|---|---|---|---|---|---|
| 1 | Viscose Process Regenerated Cellulose. | 1¾ | 0.0048 | 0.0010 | 49 |
| 2 | do | 1¾ | 0.0048 | 0.0010 | 49 |
| 3 | do | 1¾ | 0.0048 | 0.0010 | 34 |
| 4 | do | 1¾ | 0.0048 | 0.0010 | 54 |
| 5 | do | 1¾ | 0.0048 | 0.0010 | 38 |
| 6 | do | 1¾ | 0.0048 | 0.0010 | 43 |

Example II 294 mls. of distilled water were placed in the upper, i.e., fermentor compartment of a Gerhardt dialysis flask. 1175 mls. of a 0.15% glucose aqueous solution were placed in the bottom, i.e., the reservoir compartment of the dialysis flask. The external powers utilized were:

(a) a standard rotary shaker operater at 200 cycles per minute at an ambient temperature of 30° C., and (b) a standard reciprocating laboratory shaker operated at 99 strokes per minute at an ambient temperature of 30° C. The fermentor compartment of the Gerhardt dialysis apparatus was sampled periodically and assayed for glucose concentration and the rate of diffusion computed and expressed as in the same manner as in Example I above. The results of five runs are set forth in Table II. The mean $ET_{50}$ was 484 minutes.

TABLE II

| Run | Type of Shaker | Shaking Speed (c.p.m.) | Semipermeable Membrane | Stock Size, in. (flat) | Average Pore Size (microns) | Wall Thickness (inches) | $ET_{50}$ (minutes) |
|---|---|---|---|---|---|---|---|
| 1 | Rotary [1] | [1] 200 | Viscose Process Regenerated Cellulose. | 3 | 0.0048 | 0.0043 | 480 |
| 2 | do | [1] 200 | do | 3 | 0.0048 | 0.0043 | 504 |
| 3 | do | [1] 200 | do | 3 | 0.0048 | 0.0043 | 450 |
| 4 | Reciprocating | 99 | do | 3 | 0.0048 | 0.0043 | 498 |
| 5 | do | 99 | do | 3 | 0.0048 | 0.0043 | 492 |

[1] A standard rotary shaker operated at 200 cycles per minute was recommended by Gerhardt for optimum results.

A comparison was made of the bacteria concentration obtainable by the fermentation process utilizing the Dews dialysis fermentor apparatus and the Gerhardt dialysis flask, which exemplifies an advanced state of the art in dialysis culture flasks.

Example III

The unassembled components of the Dews dialysis fermentor apparatus were autoclaved for a period of 15 minutes at a temperature of 250° F. The apparatus was assembled and 155 mls. of distilled water were added to the fermentation compartment, after which the assembled apparatus was autoclaved for a period of 15 minutes at a temperature of 250° F. 1000 mls. of sterile 4% NZA media were introduced aseptically into the reservoir. Aseptic delivery was accomplished by introducing the media hose delivery needle into the reservoir stopper. The dialysis fermentation apparatus was mounted on a standard laboratory reciprocating shaker and equilibrated at a temperature of 37° C. and at 88 strokes per minute for a period of 40 minutes. At the conclusion of the equilibrium period, the fermentor compartment was inoculated with 1.5 mls. of Staphylococcus aureus seed culture. The inoculum was obtained by seeding 20 mls. of a 4% N-Z-Amine A medium (NZA) in a 250 ml. Erlenmeyer flask with 1 ml. of thawed Staphylococcus aureus seed stock and shaking on a standard laboratory reciprocating shaker at 88 strokes per minute for a period of six hours at a temperature of 37° C. The 4% NZA media was prepared by dissolving 40 grams of N-Z-Amine A, 4 grams of Difco yeast extract, and 1 gram of $K_2HPO_4$ into 1000 mls. of distilled $H_2O$, adjusting the pH of the resultant mixture to 6.9 with 10 N NaOH and sterilizing by autoclaving at a temperature of 250° F. for a period of 15 minutes. Six ml. samples were periodically withdrawn from the fermentation compartment by means of a 3" 19 gauge needle attached to a 10 ml. syringe. Acess to the fermentation compartment was obtained through the needle puncture occupied by the air vent assembly which was replaced after sampling. Viable cell counts were obtained by plating appropriate dilutions of the samples on Trypticase Soy Agar. Enterotoxin B concentrations were determined by means of the Oudim gel diffusion assay. The results of several runs are set forth in Table III below.

TABLE III

| Run | Peak Enterotoxin Concentration (µg./ml.) | Peak Viable Cell Count ($10^9$/ml.) | Culture Age at Peak Count (hours) |
|---|---|---|---|
| 1 | 1,626 | 124 | 42 |
| 2 | 1,788 | 116 | 54 |
| 3 | 1,389 | 123 | 48 |
| 4 | 1,335 | 118 | 48 |
| 5 | 1,635 | 163 | 18 |
| 6 | 1,650 | 89 | 41 |
| 7* | 674 | 16 | 23 |
| 8* | 747 | 16 | 23 |

*Control (Dialysis not permitted to occur).

*Example IV*

Components of the Gerhardt dialysis flask were assembled and 100 mls. of distilled water were added to the upper compartment, i.e., fermentation chamber, of the Gerhardt apparatus. 1000 mls. of 4% N-Z-Amine A medium was prepared as described in Example III, and introduced into the bottom compartment, i.e., reservoir, of the flask. The apparatus and its contents were sterilized by autoclaving at 250° F. for a period of 15 minutes. The dialysis fermentation apparatus was motivated by a standard rotary shaker operated at 200 cycles per minute at a temperature of 37° C. At the conclusion of the equilibrium period, the fermentor compartment was inoculated with 1.0 mls. of *Staphylococcus aureus* seed culture prepared as described in Example III above. The viable cell counts of the cultures were obtained by plating samples on Trypticase Soy Agar. The enterotoxin B concentrations were determined by Oudin gel diffusion assay. The results of the evaluations of one run are set forth in Table IV below.

TABLE IV

| Test | Enterotoxin Concentration (µg./ml.) | Viable Cell Count ($10^9$/ml.) | Age Culture (hours) |
|---|---|---|---|
| 1 | 1,350 | 53.7 | 18 |
| 2 | 1,430 | 62.0 | 24 |
| 3 | 1,470 | 87.3 | 48 |

*Example V*

The experiment of Example V was conducted in accordance with the procedure of Example IV above, with the exception that 250 mls. of distilled water were added to the fermentation compartment instead of 100 mls. The results of the evaluations of one run are set forth in Table V below.

TABLE V

| Test | Enterotoxin Concentration (µg./ml.) | Viable Cell Count ($10^9$/ml.) | Age Culture (hours) |
|---|---|---|---|
| 1 | 558 | 14.7 | 18 |
| 2 | 590 | 20.3 | 24 |
| 3 | 690 | 24.3 | 48 |

Thus it is apparent that the utilization of the instant dialysis fermentation apparatus (Example III) produces a viable cell count and enterotoxin B level superior to the optimum results obtained by the utilization of the Gerhardt dialysis flask as shown in Example IV.

The apparatus is primarily utilized to produce an accelerated dialysis of nutrients from the reservoir into the fermentation chamber and thus realize a greater concentration of bacteria, tissue cells or other organisms as the result of this additional feeding. The instant apparatus also has utility in symbiotic growth studies.

Although we have described our invention with a certain degree of particularity, it is understood that the present disclosure has been made only by way of example and that numerous changes in the details of construction and the combination and arrangement of parts may be resorted to without departing from the spirit and scope of the invention as hereinafter claimed.

We claim:

1. A system comprising a wasp-waist hourglass-shaped vessel having a semipermeable tubular membrane extending horizontally and longitudinally throughout the entire center thereof, outboard compartment means attached to both ends of the membrane and extending beyond the ends of the vessel, fastening means securing the outboard compartment means to the vessel.

2. A system in accordance with claim 1 comprising ingress and egress means positioned on the periphery of the vessel thereof.

3. A system in accordance with claim 2 comprising ingress and egress means positioned on the periphery of the outboard compartment thereof.

4. A system in accordance with claim 1 comprising ingress and egress means positioned on the periphery of the vessel and outboard compartment thereof.

5. A system comprising a wasp-waist hourglass-shaped vessel having a semipermeable tubular membrane extending horizontally and longitudinally throughout the entire center thereof, outboard compartment means attached to both ends of the membrane and extending beyond the ends of the vessel, ingress and egress means located on the periphery of the vessel and outboard compartments, support means, fastening means securing the vessel in a horizontal position to the frame of the support means and additional fastening means securing the outboard compartments to the vessel.

References Cited by the Examiner

UNITED STATES PATENTS

| | | | |
|---|---|---|---|
| 3,055,504 | 9/1962 | Schultz | 210—321 X |
| 3,186,917 | 6/1965 | Gerhardt et al. | 210—321 X |
| 3,221,878 | 12/1965 | Brett | 210—321 X |

REUBEN FRIEDMAN, *Primary Examiner.*

F. SPEAR, *Assistant Examiner.*